Patented Mar. 17, 1942

2,276,666

UNITED STATES PATENT OFFICE 2,276,666

α-CHLORO-β-ALKOXY-BUTYRALDEHYDES AND PROCESS OF PREPARING THEM

Walter Ostrowski and Otto Nicodemus, Frankfort-on-the-Main, Germany, assignors, by mesne assignments, to General Aniline & Film Corporation, New York, N. Y., a corporation of Delaware No Drawing. Application May 3, 1939, Serial No. 271,514. In Germany May 9, 1938

13 Claims. (Cl. 260—602)

The present invention relates to α-chloro-β-alkoxy-butyraldehydes and to a process of preparing them.

We have found that lower saturated aliphatic primary alcohols react at a low temperature and in the presence of a small quantity of an alkaline agent with α-chlorocrotonic aldehyde

forming addition products in good yield. As alkaline agents there may be used any of the substances suitable for alkaline condensations; alkali metal hydroxides such as sodium hydroxide or potassium hydroxide have been found to be superior for the purpose in comparison with other alkaline agents, for instance potassium carbonate or sodium carbonate, furthermore potassium alcoholate or sodium alcoholate, but these may likewise be used. The alkaline agent may be used, for instance, in a ratio of about 1 to 200 to about 1 to 400.

The reaction is preferably carried out at temperatures between about $-10°$ C. and about $+10°$ C.

As alcohols there may, for instance, be used: methyl alcohol, ethyl alcohol, propyl alcohol.

The reaction is suitably carried out in the presence of such an excess of the alcohol that the alcohol serves as solvent.

During the reaction compounds of the formula

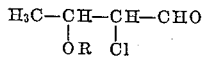

are formed, wherein R stands for a lower aliphatic saturated hydrocarbon radical. These compounds are new; they are clear colorless liquids. They are useful as intermediate products for the preparation of softening agents and solvents.

The following examples serve to illustrate the invention, but they are not intended to limit it thereto:

(1) 1900 grams of α-chlorocrotonic aldehyde are introduced, drop by drop within 8 hours at $0°$ to $+5°$ C., while stirring, into 5 liters of methanol to which about 20 cc. of caustic soda solution of 33 per cent strength have been added. After the introduction is complete, about 5 cc. of the caustic soda solution are further added. The mixture is allowed to stand over night at $0°$ C.; it then shows only a feebly alkaline reaction to turmeric paper. For the further treatment the mixture is just acidified with a small quantity of glacial acetic acid and the methanol is distilled under reduced pressure at as low a temperature as possible. The remaining aldehyde is first distilled under a pressure of 10 mm., while the temperature inside the vessel is raised to $100°$ C., and then fractionated. 1600 grams of α-chloro-β-methoxy-butyraldehyde are obtained boiling at $48°$ C. to $50°$ C. under a pressure of 10 mm.; this yield is 65 per cent of the theoretical yield, without considering the non-transformed chlorocrotonic aldehyde which can be used again.

(2) As described in Example 1, ethanol is added to α-chlorocrotonic aldehyde. There is obtained in nearly the same yield α-chloro-β-ethoxy-butyraldehyde boiling at $55°$ C. to $56°$ C. under a pressure of 10 mm.

We claim:

1. The process of preparing α-chloro-β-alkoxy butyraldehyde which comprises causing a lower saturated aliphatic primary alcohol to act upon α-chlorocrotonic aldehyde in a solution of an alkaline compound of an alkali metal at a temperature lower than about $+10°$ C.

2. The process of preparing α-chloro-β-alkoxy butyraldehyde which comprises causing a lower saturated aliphatic primary alcohol to act upon α-chlorocrotonic aldehyde in a solution of an alkaline compound of an alkali metal in an excess of said lower saturated aliphatic alcohol as a solvent at a temperature of between about $-10°$ C. and about $+10°$ C.

3. The process as defined in claim 1 wherein the alkaline compound is an alkali metal hydroxide.

4. The process as defined in claim 2 wherein the alkaline compound is an alkali metal hydroxide.

5. The process as defined in claim 1 wherein the alkaline compound is an alkali metal carbonate.

6. The process as defined in claim 2 wherein the alkaline compound is an alkali metal carbonate.

7. The process as defined in claim 1 wherein the alkaline compound is an alkali metal alcoholate of a lower saturated alcohol.

8. The process as defined in claim 2 wherein the alkaline compound is an alkali metal alcoholate of a lower saturated alcohol.

9. The process of preparing α-chloro-β-alkoxy butyraldehyde which comprises causing methyl alcohol to act upon α-chlorocrotonic aldehyde in a solution of sodium hydroxide and of an excess of methyl alcohol at a temperature between about $0°$ C. and about $+5°$ C.

10. The process of preparing α-chloro-β-alkoxy butyraldehyde which comprises causing ethyl alcohol to act upon α-chlorocrotonic aldehyde in a solution of sodium hydroxide and of an excess of ethyl alcohol at a temperature between about 0° C. and about +5° C.

11. The compounds of the following formula

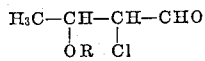

wherein R stands for a lower aliphatic saturated hydrocarbon radical, said compounds being clear, colorless liquids.

12. The α-chloro-β-methoxy butyraldehyde, being a clear, colorless liquid, boiling at about 48° C. to 50° C. under a pressure to 10 millimeters.

13. The α-chloro-β-ethoxy-butyraldehyde, being a clear, colorless liquid, boiling at about 55° C. to 56° C. under a pressure of 10 millimeters.

WALTER OSTROWSKI.
OTTO NICODEMUS.